(12) United States Patent
Reese et al.

(10) Patent No.: US 7,262,869 B2
(45) Date of Patent: Aug. 28, 2007

(54) CONTROLLING FONT USAGE BASED ON PRINTER IDENTIFICATION INFORMATION

(75) Inventors: Curtis Reese, Boise, ID (US); Shane Konsella, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 947 days.

(21) Appl. No.: 10/385,101

(22) Filed: Mar. 10, 2003

(65) Prior Publication Data

US 2004/0179216 A1 Sep. 16, 2004

(51) Int. Cl.
*G06K 15/02* (2006.01)
*G06F 3/12* (2006.01)
*G06F 12/14* (2006.01)

(52) U.S. Cl. .................. 358/1.11; 358/1.14; 358/1.15; 715/542

(58) Field of Classification Search ............... 358/1.11, 358/1.14, 1.15, 1.18; 715/542
See application file for complete search history.

(56) References Cited

U.S. PATENT DOCUMENTS

| | | | |
|---|---|---|---|
| 4,883,291 A | 11/1989 | Robertson | |
| 5,239,621 A | 8/1993 | Brown, III et al. | |
| 5,390,297 A * | 2/1995 | Barber et al. ................. | 726/29 |
| 5,533,174 A | 7/1996 | Flowers, Jr. et al. | |
| 5,550,932 A * | 8/1996 | Blaylock et al. ............ | 382/139 |
| 5,577,183 A | 11/1996 | Weyand | |
| 5,586,241 A | 12/1996 | Bauermeister et al. | |
| 5,586,242 A | 12/1996 | McQueen, III et al. | |
| 5,729,666 A | 3/1998 | Konsella et al. | |
| 6,147,769 A * | 11/2000 | Jackson et al. ............ | 358/1.18 |
| 6,337,924 B1 | 1/2002 | Smith | |
| 2002/0136578 A1 | 9/2002 | Johnson et al. | |
| 2002/0181001 A1 | 12/2002 | Klosterman et al. | |
| 2003/0009483 A1 | 1/2003 | Reese | |
| 2003/0023764 A1 | 1/2003 | Reese et al. | |

OTHER PUBLICATIONS

Jul. 8, 2004 Search Report for UK Application No. GB0403974.9.
Hewlett-Packard webpage entitled "HP LaserJet Printers—PCL (Printer Command Language)"; 4 pgs.; 1998.
Hewlett-Packard webpage entitled "HP LaserJet Printers—HP Secure Font Box"; 2 pgs.; 2001.
Electronic Forms Plus, Inc. webpage entitled "Electronic Forms"; 1 pg.; Sep. 19, 2002.
Electronic Forms Plus, Inc. webpage entitled "Integrating Form Overlays Directly into Applications—Using Printer-Resident Forms"; 8 pgs; Nov. 1, 2002.
Electronic Forms Plus Inc. webpage entitled "HP PCL Printer Control Language"; 8 pgs; Feb. 28, 2003.

* cited by examiner

*Primary Examiner*—Twyler Lamb
*Assistant Examiner*—Pawandeep S Dhingra

(57) ABSTRACT

A method of controlling usage of fonts stored in a printer includes detecting a request for use of a first one of the fonts by a print job. Printer identification information contained in the first font is compared to a printer identifier stored in the printer. Usage of the first font by the printer is controlled based on the comparison.

24 Claims, 8 Drawing Sheets

| Byte Offset | Most Significant Byte | Least Significant Byte | Byte Offset |
|---|---|---|---|
| Byte | 15 (MSB) | 7 (LSB) 0 | Byte |
| 0 | Font Descriptor Size (72+(2xMaxPtrCount)) | | 1 |
| 2 | Descriptor Format (16) | Symbol Set Type | 3 |
| 4 | Style MSB | Reserved | 5 |
| 6 | Baseline Position | | 7 |
| 8 | Cell Width | | 9 |
| 10 | Cell Height | | 11 |
| 12 | Orientation | Spacing | 13 |
| 14 | Symbol Set | | 15 |
| 16 | Pitch (Nominal) | | 17 |
| 18 | Height | | 19 |
| 20 | x-Height | | 21 |
| 22 | Width Type | Style LSB | 23 |
| 24 | Stroke Weight | Typeface LSB | 25 |
| 26 | Typeface MSB | Serif Style | 27 |
| 28 | Quality | Placement | 29 |
| 30 | Underline Position | Underline Thickness | 31 |
| 32 | Text Height | | 33 |
| 34 | Text Width | | 35 |
| 36 | First Code | | 37 |
| 38 | Last Code/Number of Characters | | 39 |
| 40 | Pitch Extended (Nominal) | Height Extended | 41 |
| 42 | Cap Height | | 43 |
| 44-46 | Font Number | | 45-47 |
| 48-62 | Font Name | | 49-63 |
| 64 | Scale Factor | | 65 |
| 66 | Master Underline Position | | 67 |
| 68 | Master Underline Thickness | | 69 |
| 70 | Font Scaling Technology | Variety | 71 |
| 72 | PtrSerialNum | | 73 |
| 74 | MaxPtrCount | | 75 |
| ... | ... | | ... |
| Desc. Size | Segmented Font Data | | |
| | ... | | ... |
| | | | # - 3 |
| # - 2 | Reserved (0) | Checksum | # - 1 |

Fig. 5

CONTROLLING FONT USAGE BASED ON PRINTER IDENTIFICATION INFORMATION

THE FIELD OF THE INVENTION

The present invention generally relates to printers, and more particularly to controlling font usage based on printer identification information.

BACKGROUND OF THE INVENTION

A problem exists of users illegally copying fonts from either a printer or client computer file system to another printer or client computer file system. Currently, Hewlett-Packard offers a font security product referred to as a Secure Font Box®. In essence, this product is an external device that has flash memory for font storage, logic that detects the presence of a valid user identification card, logic that downloads fonts from the card to printer memory, and logic that removes the fonts from printer memory upon removal of the user identification card from the Secure Font Box®. This device currently costs several hundred dollars, and requires fonts to be stored on the external device. The device provides logic that parses data streams sent to the printer to detect the presence of font selection strings that reference fonts it is managing. This can negatively impact printing performance, even for jobs that do not use fonts protected by the device.

SUMMARY OF THE INVENTION

One form of the present invention provides a method of controlling usage of fonts stored in a printer. The method includes detecting a request for use of a first one of the fonts by a print job. Printer identification information contained in the first font is compared to a printer identifier stored in the printer. Usage of the first font by the printer is controlled based on the comparison.

BRIEF DESCRIPTION OF THE DRAWINGS

FIG. 5 is a diagram illustrating a font data structure for a printer-based TrueType® font, which includes a printer serial number field and a maximum printer count field for providing font security according to one embodiment of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
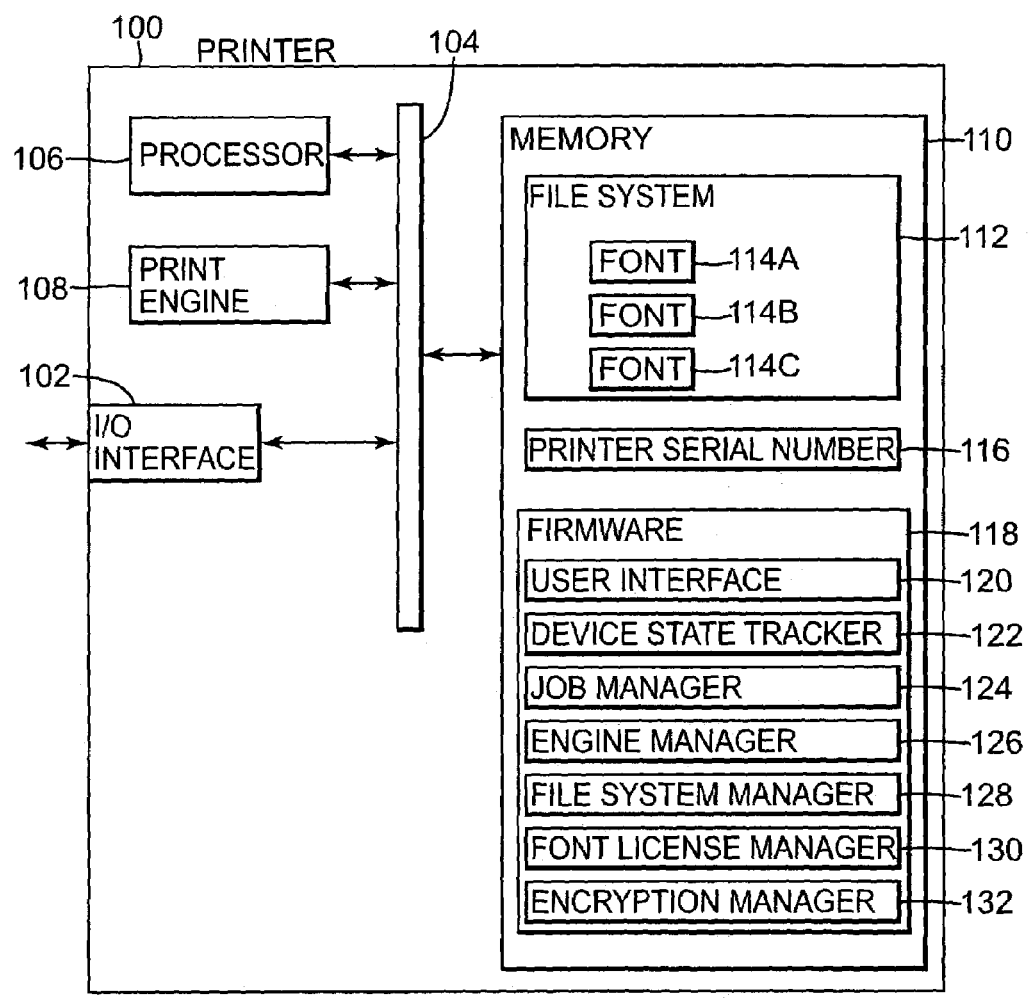
FIG. 1 is a block diagram illustrating major components of a printer configured to provide font security according to one embodiment of the present invention.

FIG. 1 is a block diagram illustrating major components of a print apparatus or printer 100 configured to provide font security according to one embodiment of the present invention. Printer 100 includes input/output (I/O) interface 102, processor 106, print engine 108, and memory 110, which are communicatively coupled together via bus 104. Printer 100 is configured to be coupled to one or more computers (not shown) via I/O interface 102. In one embodiment, I/O interface 102 is a serial interface, such as a universal serial bus (USB) interface. In another embodiment, I/O interface 102 is a network interface. In other embodiments, other types of interfaces may be used, including those for wireless communications.

In one embodiment, print engine 108 is a laser print engine, and includes conventional laser printer elements (not shown) for forming an image on media, such as a laser, a rotating polygonal mirror to deflect the laser beam, a photoconductive drum, toner dispensers, media handlers, as well as other conventional elements known to those of ordinary skill in the art. It is to be understood that other types of printers and their associated elements can be utilized by the present invention.

In one embodiment, memory 110 includes multiple types of memory, including both volatile and non-volatile memory, such as random access memory (RAM), read-only memory (ROM), and flash memory. In one form of the invention, memory 110 stores a file system 112, a printer identifier (e.g., printer serial number) 116, and firmware 118. A plurality of fonts 114A-114C (collectively referred to as fonts 114) are stored in file system 112, and are available for use by a print application in a computer (not shown) coupled to the printer 100. Firmware 118 includes a plurality of firmware modules 120-132, which include instructions that are executed by processor 106. In one embodiment, the firmware modules include user interface 120, device state tracker 122, job manager 124, engine manager 126, file system manager 128, font license manager 130, and encryption manager 132.

User interface 120 handles receipt and processing of user input information that is input on a front panel (not shown) of printer 100, and handles the display of information to the user. Device state tracker 122 retrieves status information from various hardware components (e.g., sensors) in printer 100 in response to received status inquiries (e.g., how much toner is left in the toner cartridge), and forwards status information to the requesting component. Job manager 124 parses and processes data streams that printer 100 receives from various input/output connections (e.g., I/O interface 102), and invokes other software components as appropriate to complete print jobs. Engine manager 126 controls and provides an interface to print engine 108. File system manager 128 controls and provides an interface to file system 112. File system manager 128 receives file system requests from other software components, converts the requests into an appropriate language to manipulate the file system 112, and returns appropriate data to the requesting component. Font license manager 130 performs various font security functions, as described in further detail below. Encryption manager 132 performs encryption and decryption functions, as described in further detail below.

In one embodiment, printer 100 provides security for those fonts 114 that are stored on the local file system 112 by checking for a printer serial number in a requested font 114. In one form of the invention, when a print job requests that one of the fonts 114 be used for printing, the requested font 114 is validated for use by the presence of a printer serial number in the header of the font 114. In one embodiment, if the font data 114 does not contain a serial number that matches the serial number 116 of printer 100, the print job is rejected. In another embodiment, the print job is printed with font substitutions. In either case, the user is informed of the job-processing results in one form of the invention.

In one form of the invention, if a font 114 does not include a printer serial number in its header, printer 100 writes its serial number 116 to the font header. In one embodiment, fonts 114 are configured to include multiple printer serial numbers based on the licensing agreement established between the customer and the font provider. In one form of the invention, the header in each font 114 includes a field that specifies the maximum number of printer serial numbers that can be stored in the font header. In one embodiment, printer 100 does not attempt to add its printer serial number 116 to a font header when the maximum number of serial numbers has already been attained. Font security functions are described in further detail below with reference to FIGS. 2-8.

Figure 2:
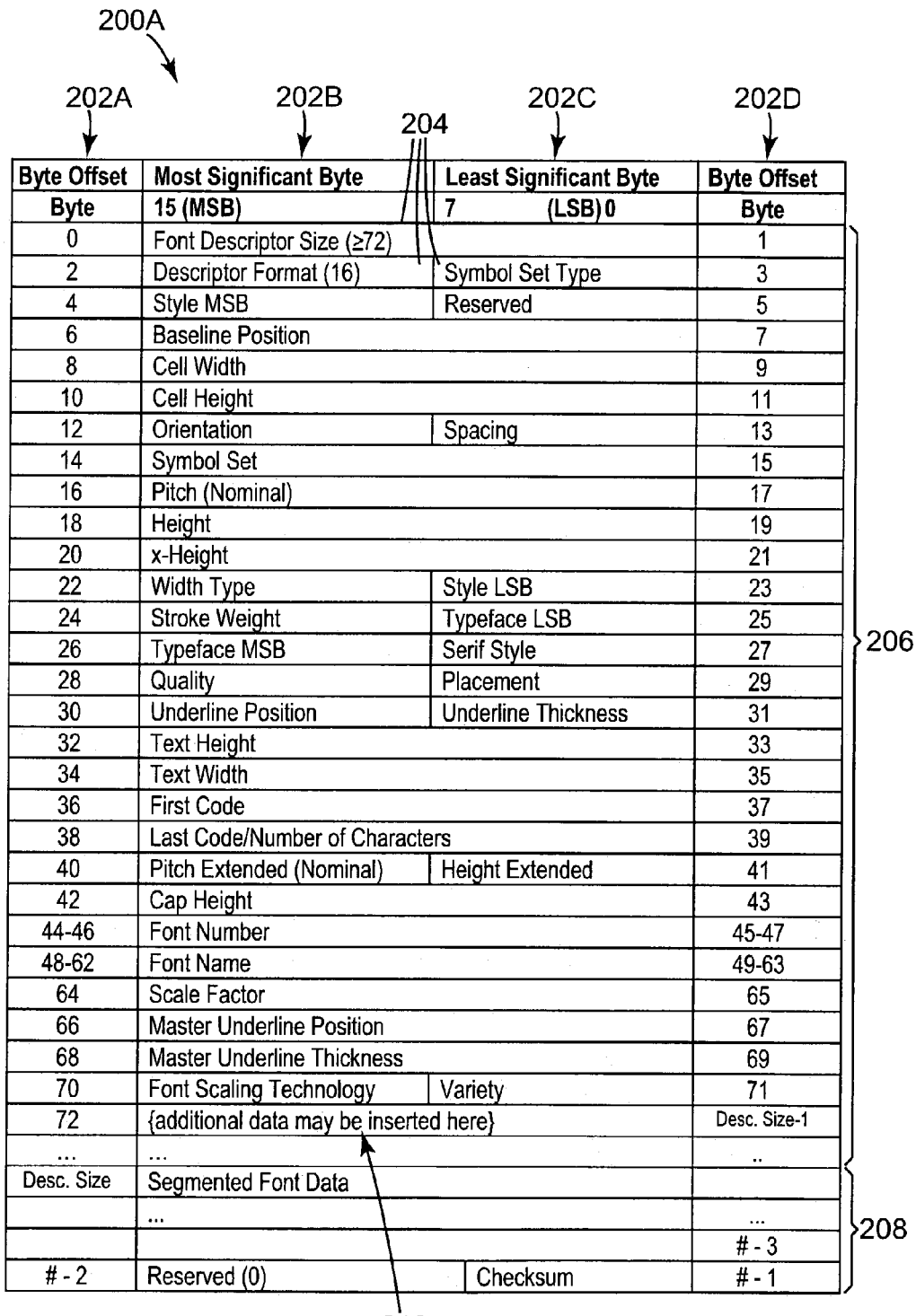
FIG. 2 is a diagram illustrating a font data structure for a printer-based TrueType® font.

FIG. 2 is a diagram illustrating a font data structure 200A for a printer-based TrueType® font. Font data structure 200A is represented by a table that includes four columns 202A-202D, and a plurality of fields 204. The top portion of the table is a font header 206, which is followed by segmented font data 208. The font header 206 specifies overall font data parameters, such as the font's name, list of characters in the font, whether the font is italic or bold, and other information that is typically applicable to every character within the font. The segmented font data 208 provides additional font information, such as character descriptions and character metrics.

The first column 202A and the fourth column 202D of Table 200A identify byte offset information for each field 204. The byte offset information identifies the position of the first byte of a given field 204 relative to the first byte in the font header 206 (i.e., byte 0). The font data structure 200A is essentially divided into two 8-bit byte segments, including a least significant byte (LSB—bits 0-7) and a most significant byte (MSB—bits 8-15). Column 202B corresponds to the most significant byte, and column 202C corresponds to the least significant byte. As shown in FIG. 2, each data field 204 starts on an even byte offset and consumes an even or odd number of bytes, or starts on an odd byte offset and consumes an odd number of bytes.

Font header 206 includes seventy-two bytes of data, and allows additional header fields 210 to be included beginning at byte offset seventy-two. One embodiment of the present invention implements additional header fields 210 to provide font security, as described in further detail below with reference to FIG. 3.

Figure 3:
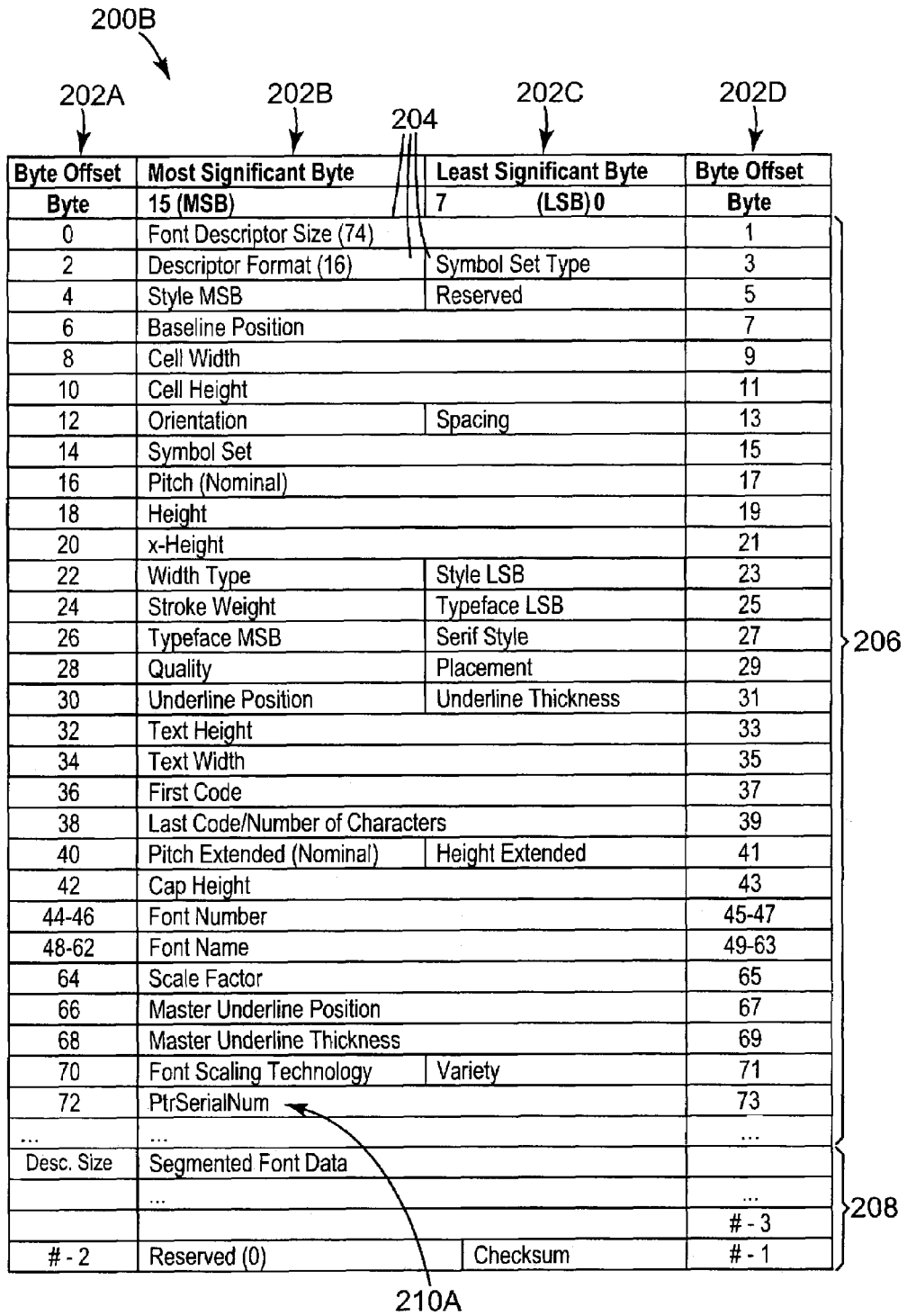
FIG. 3 is a diagram illustrating a font data structure for a printer-based TrueType® font, which includes a printer serial number field for providing font security according to one embodiment of the present invention.

FIG. 3 is a diagram illustrating a font data structure 200B for a printer-based TrueType® font, which includes a printer serial number field (PtrSerialNum) 210A for providing font security according to one embodiment of the present invention. In one form of the invention, the printer serial number field 210A begins at byte offset seventy-two, consumes two bytes, and is used to store printer identification information (e.g., printer serial number(s)).

In one embodiment, each of the fonts 114 in the printer file system 112 (shown in FIG. 1) has a data structure 200B with a printer serial number field 210A. In another embodiment, one or more of the fonts 114 has a data structure that is different than data structure 200B, but that still includes a printer serial number field 210A. The font data structure shown in FIGS. 2 and 3 illustrates a data structure for one type of font (i.e., a TrueType® font). As will be understood by persons of ordinary skill in the art, the data structure for fonts varies depending upon the type of font (e.g., TrueType®, Intellifont®, Adobe® Type-1, etc.), and correspondingly, the provision of a printer serial number field 210A will vary depending upon the type of font.

Figure 4:
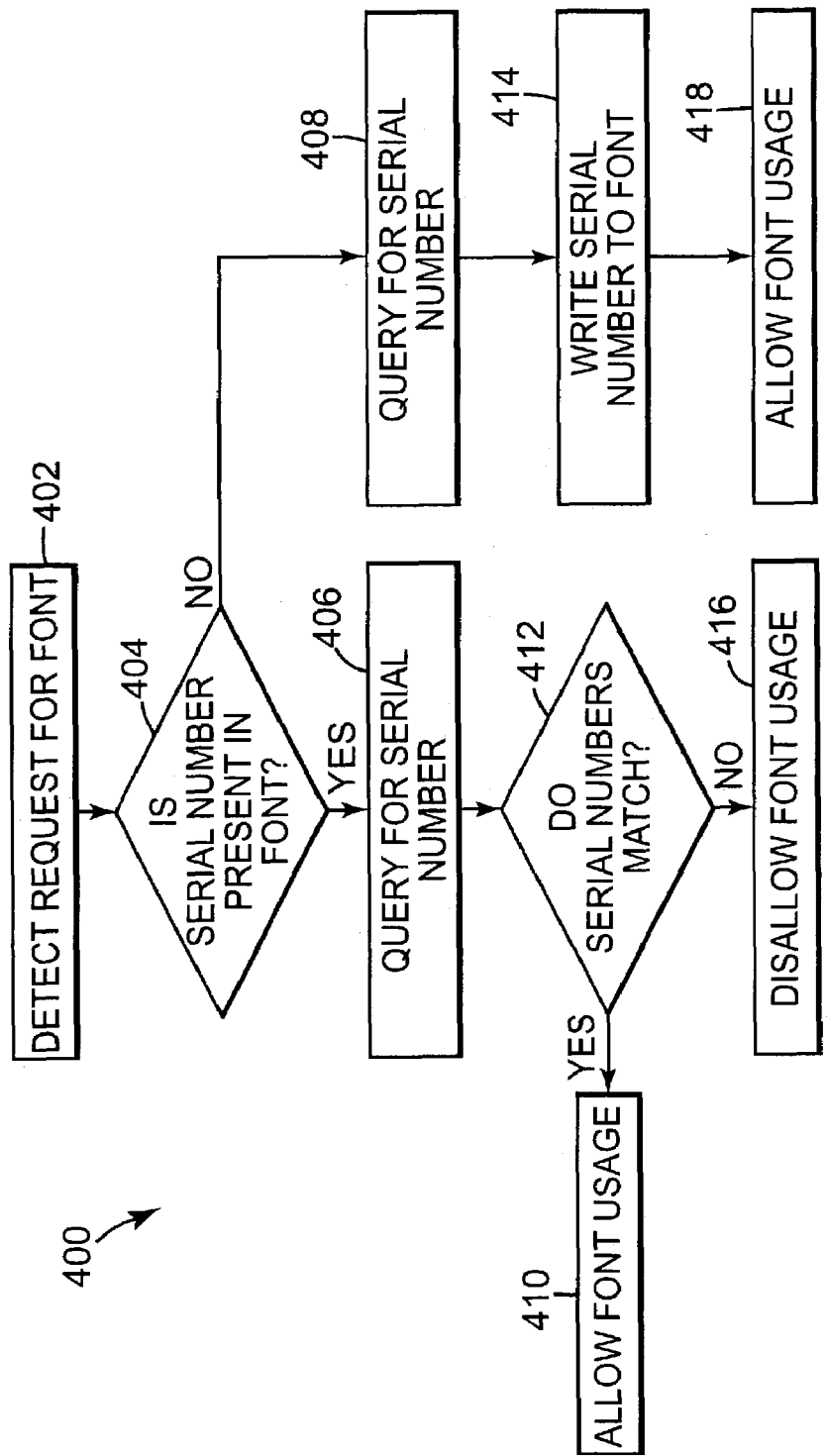
FIG. 4 is a flow diagram illustrating a font security method performed by the printer shown in FIG. 1 according to one embodiment of the present invention.

FIG. 4 is a flow diagram illustrating a font security method 400 performed by printer 100 (FIG. 1) according to one embodiment of the present invention. In step 402, job manager 124 detects that a print job has requested one of the fonts 114 in file system 112. In step 404, job manager 124 invokes font license manager 130, which checks the font header 206 (FIG. 2) of the requested font 114 for the presence of a serial number in the printer serial number field 210A. If a serial number is present, in step 406, font license manager 130 issues a query for the serial number 116 of printer 100, and the serial number 116 is provided to font license manager 130 by device state tracker 122 in response to the query. In step 412, font license manager 130 compares the printer serial number 116 to the serial number in the printer serial number field 210A of the requested font 114, and determines if the values match. If the values match, in step 410, font license manager 130 informs job manager 124 that the requested font 114 can be used in the print job. If the values do not match, in step 416, font license manager 130 informs job manager 124 that the requested font 114 cannot be used in the print job. In one embodiment, if the job manager 124 receives an indication that a requested font 114 cannot be used in a print job, the job manager 124 rejects the print job and invokes user interface 120 to inform the user that the print job cannot be completed. In another embodiment, if the job manager 124 receives an indication that a requested font 114 cannot be used in a print job, the job manager 124 uses a substitute font 114 to complete the print job, and invokes user interface 120 to inform the user that a substitute font 114 was used.

If it is determined in step 404 that the font header 206 of the requested font 114 does not include a printer serial number in the printer serial number field 210A, the method moves to step 408. In step 408, font license manager 130 issues a query for the serial number 116 of printer 100, and the serial number 116 is provided to font license manager 130 by device state tracker 122 in response to the query. In step 414, font license manager 130 writes the printer serial number 116 to the printer serial number field 210A in the font header 206 of the requested font 114, and saves the modified font 114 back to the file system 112. In step 418, font license manager 130 informs job manager 124 that the requested font 114 can be used in the print job.

Sophisticated users may attempt to copy a font 114 from one printer to another, and modify the serial number 116 in the printer serial number field 210A of the font 114. In one embodiment, the serial number data in printer serial number field 210A is encrypted with a unique key by encryption manager 132 to protect the font 114 from serial number manipulation attempts. Encryption manager 132 is invoked by font license manager 130 to decrypt the serial number data in the printer serial number field 210A prior to making the serial number comparison in step 412 of method 400.

FIG. 5 is a diagram illustrating a font data structure 200C for a printer-based TrueType® font, which includes a printer serial number field (PtrSerialNum) 210A and a maximum printer count field (MaxPtrCount) 2101B for providing font security according to one embodiment of the present invention. In one form of the invention, the printer serial number field 210A begins at byte offset seventy-two and consumes two bytes, and the maximum printer count field 210B begins at byte offset seventy-four and consumes two bytes. In one embodiment, the maximum printer count field 210B includes a value that indicates the maximum number of printer serial numbers that can be written to field 210A. The size of the printer serial number field 210A may vary from font to font, depending upon the number of licenses purchased for the font, and correspondingly the number of printer serial numbers that can be written to field 210A.

In one embodiment, each of the fonts 114 in the printer file system 112 (shown in FIG. 1) has a data structure 200C with a printer serial number field 210A and a maximum printer count field 210B. In another embodiment, one or more of the fonts 114 has a data structure that is different than data structure 200C, but that still includes a printer serial number field 210A and a maximum printer count field 210B.

Figure 6:
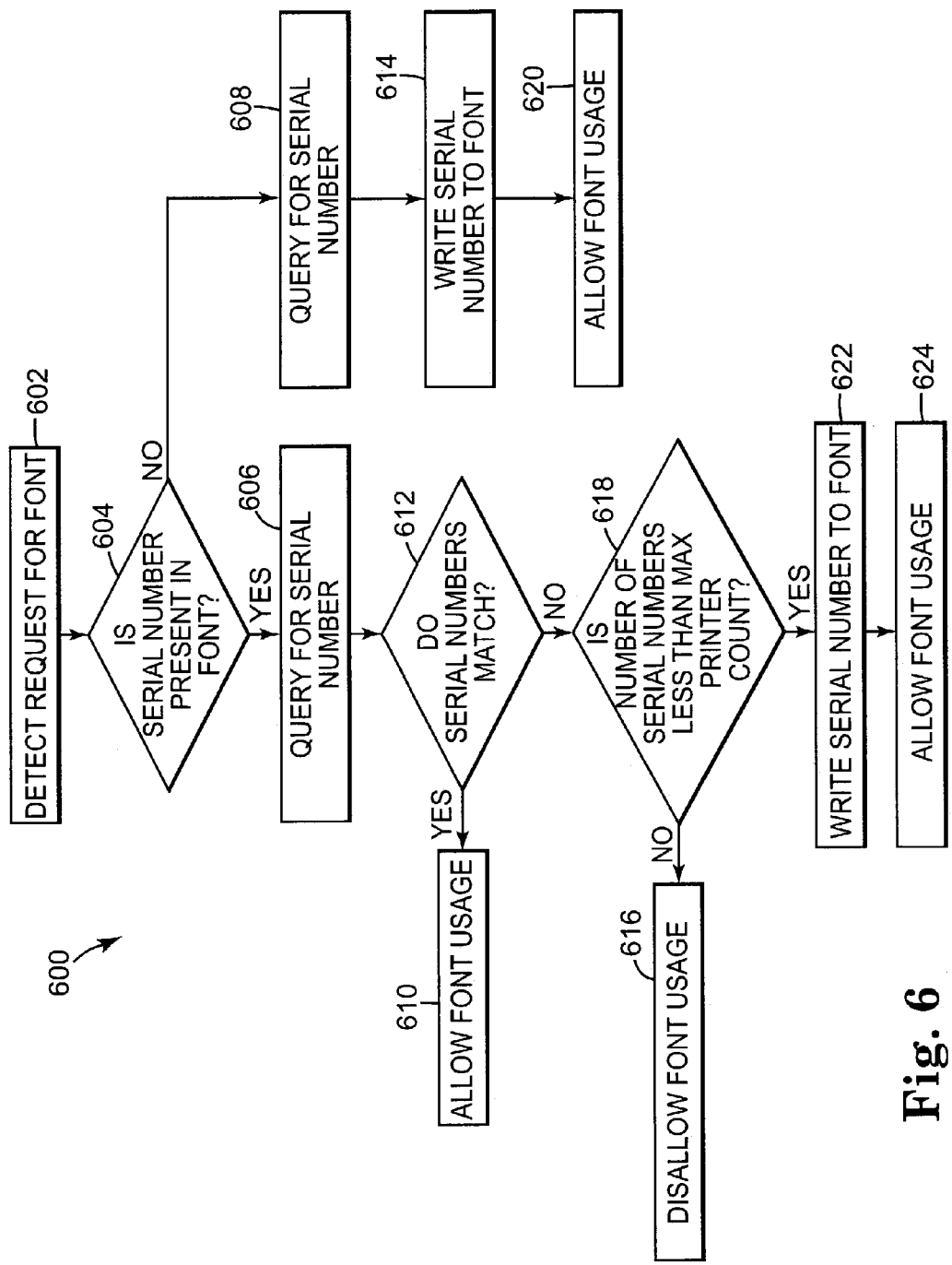
FIG. 6 is a flow diagram illustrating a font security method performed by the printer shown in FIG. 1 according to another embodiment of the present invention.

FIG. 6 is a flow diagram illustrating a font security method 600 performed by printer 100 (FIG. 1) according to another embodiment of the present invention. In step 602, job manager 124 detects that a print job has requested one of the fonts 114 in file system 112. In step 604, job manager 124 invokes font license manager 130, which checks the font header 206 (FIG. 2) of the requested font 114 for the presence of a serial number in the printer serial number field 210A.

If it is determined in step 604 that the font header 206 of the requested font 114 does not include a printer serial number in the printer serial number field 210A, the method moves to step 608. In step 608, font license manager 130 issues a query for the serial number 116 of printer 100, and the serial number 116 is provided to font license manager 130 by device state tracker 122 in response to the query. In step 614, font license manager 130 writes the printer serial number 116 to the printer serial number field 210A in the font header 206 of the requested font 114, and saves the modified font 114 back to the file system 112. In step 620, font license manager 130 informs job manager 124 that the requested font 114 can be used in the print job.

If it is determined in step 604 that a serial number is present in the requested font 114, in step 606, font license manager 130 issues a query for the serial number 116 of printer 100, and the serial number 116 is provided to font license manager 130 by device state tracker 122 in response to the query. In step 612, font license manager 130 compares the printer serial number 116 to the serial number(s) in the printer serial number field 210A of the requested font 114, and determines if there is a match. If there is a match, in step 610, font license manager 130 informs job manager 124 that the requested font 114 can be used in the print job. If there is not a match, in step 618, font license manager 130 determines whether the number of printer serial numbers in the printer serial number field 210A is less than the value specified in the maximum printer count field 210B. If the number of printer serial numbers in field 210A is not less than the value specified in field 210B, in step 616, font license manager 130 informs job manager 124 that the requested font 114 cannot be used in the print job. In one embodiment, if the job manager 124 receives an indication that a requested font 114 cannot be used in a print job, the job manager 124 rejects the print job and invokes user interface 120 to inform the user that the print job cannot be completed. In another embodiment, if the job manager 124 receives an indication that a requested font 114 cannot be used in a print job, the job manager 124 uses a substitute font to complete the print job, and invokes user interface 120 to inform the user that a substitute font 114 was used.

If it is determined in step 618 that the number of printer serial numbers in field 210A is less than the value specified in field 210B, the method moves to step 622. In step 622, font license manager 130 writes the printer serial number 116 to the printer serial number field 210A in the font header 206 of the requested font 114, and saves the modified font 114 back to the file system 112. In step 624, font license manager 130 informs job manager 124 that the requested font 114 can be used in the print job.

In one embodiment, the serial number data in printer serial number field 210A and the maximum number of printers data in field 210B are both encrypted with a unique key by encryption manager 132 to protect the font 114 from manipulation attempts. Encryption manager 132 is then invoked by font license manager 130 to decrypt the data in fields 210A and 210B prior to making the comparisons in step 612 and 618 of method 600.

Figure 7:
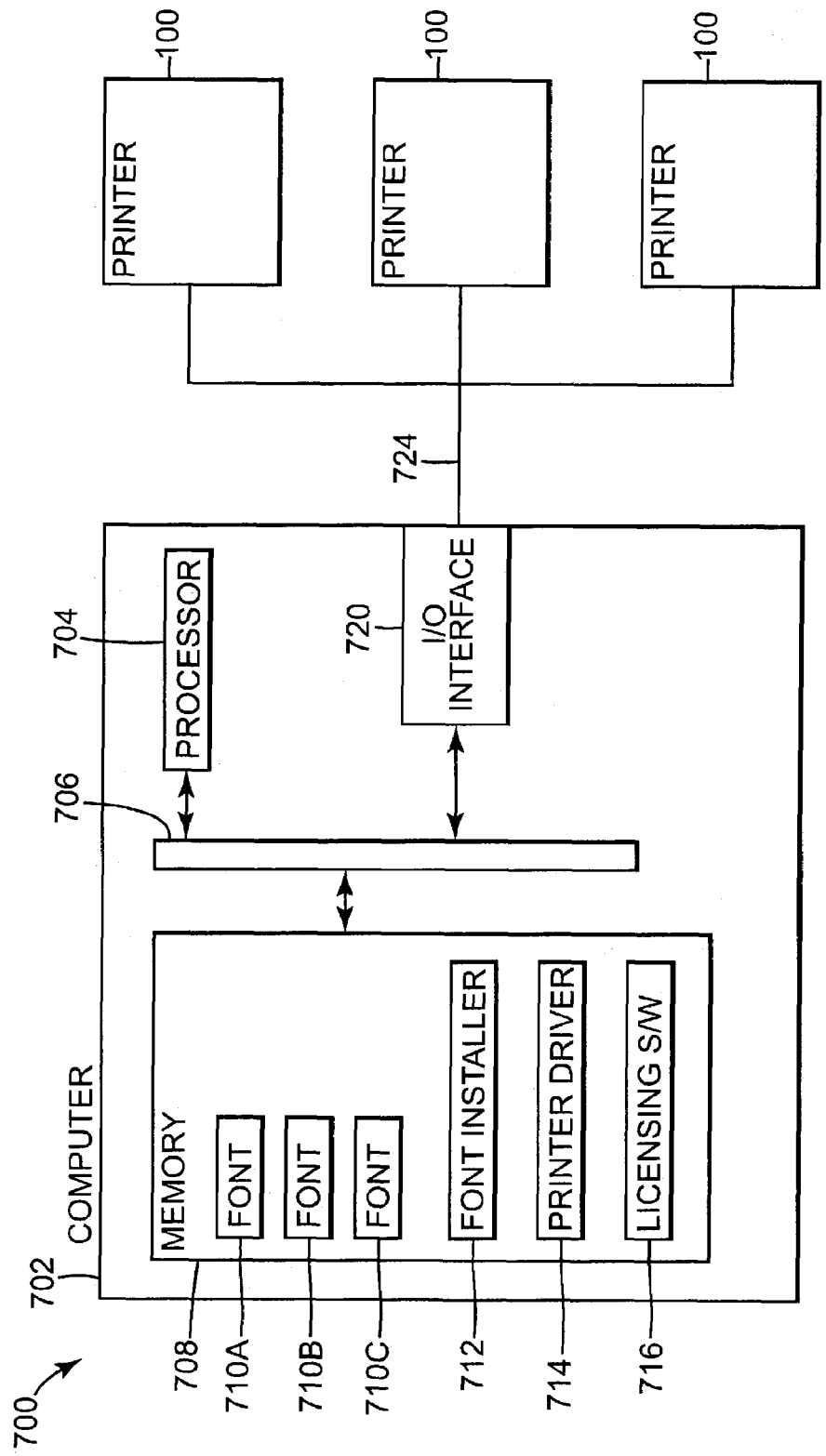
FIG. 7 is a block diagram illustrating major components of a printing system configured to provide font security according to one embodiment of the present invention.

FIG. 7 is a block diagram illustrating major components of a printing system 700 configured to provide font security according to one embodiment of the present invention. Printing system 700 includes computer 702 and a plurality of printers 100. In one embodiment, each of the printers 100 is configured in substantially the same manner as shown in FIG. 1.

Computer 702 includes processor 704, memory 708, and input/output (I/O) interface 720, which are communicatively coupled together via bus 706. Computer 702 is coupled to the plurality of printers 100 through I/O interface 720 and communication link 724. In one embodiment, I/O interface 720 is a network interface, and communication link 724 is a network, such as a local area network (LAN). In other embodiments, other types of interfaces and communication links may be used, including those for wireless communications.

In one embodiment, memory 708 includes multiple types of memory, including both volatile and non-volatile memory. Fonts 710A-710C (collectively referred to as fonts 710), font installer 712, printer driver 714, and licensing software (S/W) 716 are stored in memory 708. Printer driver 714 controls print jobs to be printed by one ore more of the printers 100. Printer driver 714 receives information to print from an application program, and translates the information to a language understood by the appropriate printer 100.

Fonts 710 are available for use by application programs running on computer 702. If a font 710 used in a document to be printed is not part of the set of fonts 114 (FIG. 1) stored in the printer 100, the font 710 is downloaded to the printer 100 before the document is printed. When an application program running on computer 702 issues a document for transmission to one of the printers 100, and the document specifies a font 710 that is not resident in the printer 100, printer driver 714 initiates a routine that results in a downloading of the requested font 710 to printer 100. The printer 100 uses the downloaded font. 710 for the print job, and then discards the font 710 from memory.

In one form of the invention, fonts 710 are installed on computer 702 by executing font installer 712. In one embodiment, font installer 712 is configured to interact with licensing software 716 and perform a font security method 800 (shown in FIG. 8) during the installation process, as described in further detail below with reference to FIG. 8.

Figure 8:
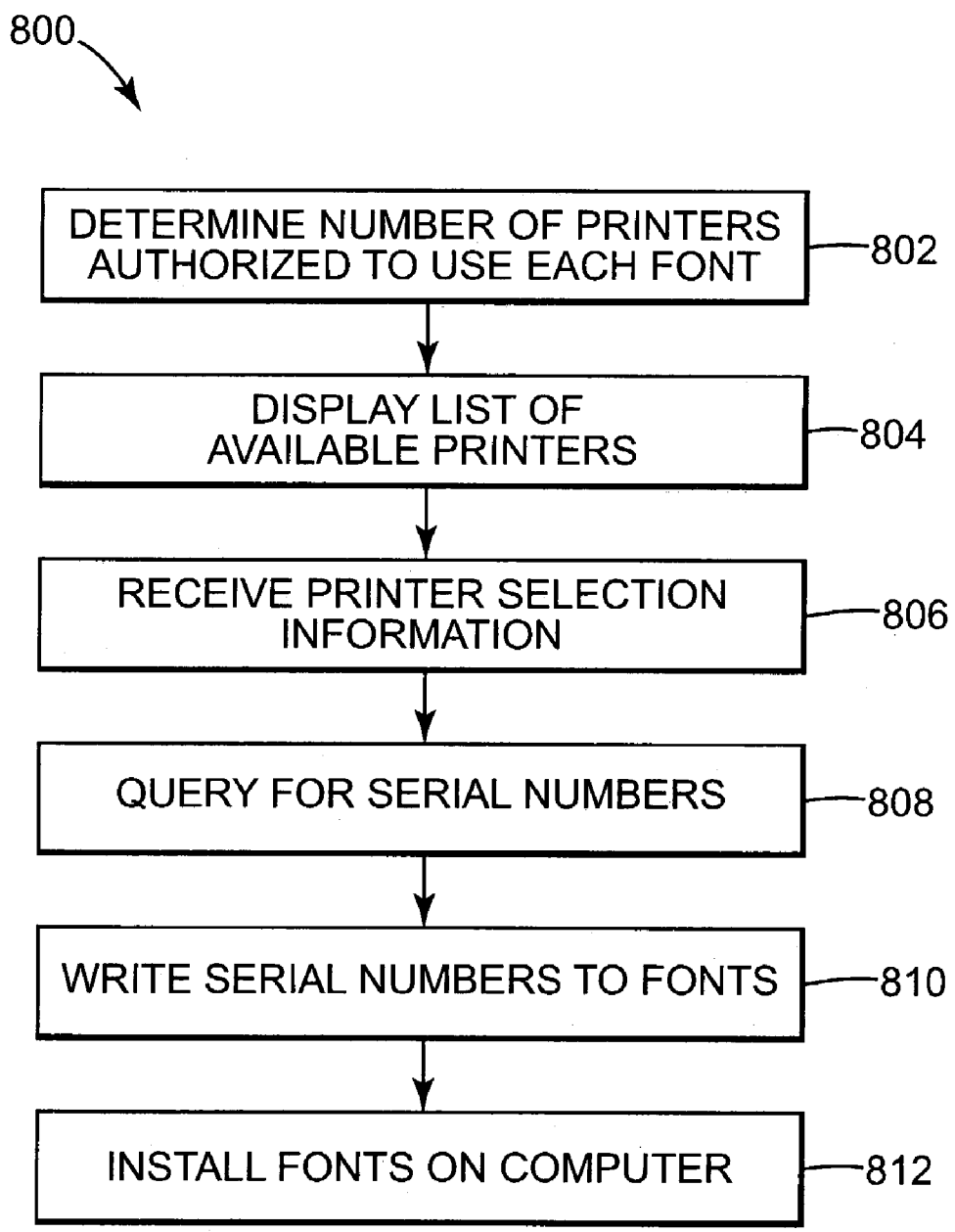
FIG. 8 is a flow diagram illustrating a font security method performed by the printing system shown in FIG. 7 according to one embodiment of the present invention.

FIG. 8 is a flow diagram illustrating a font security method 800 performed by computer 702 (FIG. 7) according to one embodiment of the present invention. In step 802, font installer 712 interacts with licensing software 716 to determine the appropriate number of printers 100 that can use each font 710. In step 804, font installer 712 causes a list of printers 100 available to computer 702 to be displayed, along with an indication of the number of printers 100 authorized to use each font 710. In step 806, font installer 712 receives selection information from an administrator or other user that identifies one or more of the available printers 100 that will be using the fonts 710 being installed on computer 702. In step 808, font installer 712 queries each of the printers 100 identified by the user, and retrieves a printer serial number 116 from each of these printers 100. In step 810, font installer 712 writes the received printer serial numbers 116 to the header 206 of each font 710 being installed on computer 702, making sure that the number of printer serial numbers 116 that are written to each header 206 does not exceed the maximum number specified by the licensing information provided by licensing software 716. In step 812, font installer 712 installs the fonts 710 on computer 702.

In one embodiment, when any of the fonts 710 are downloaded to one of the printers 100 for use in printing, the printer 100 verifies that the fonts 710 included in the data stream contain a serial number that matches the serial number 116 of that printer 100. In one form of the invention, if a matching serial number is not contained in a downloaded font 710, usage of that font 710 is disallowed by the printer 100.

In another embodiment, the printer driver 714 includes font serialization capabilities, and is configured to perform method 800 or a modified version of method 800. In one embodiment, licensing software 716 provides a user interface that allows an administrator to identify all of the printers 100 that are authorized to use particular fonts 710, and all of the client computers 702 that are authorized to use particular fonts 710. In one form of the invention, licensing software 716 downloads this authorization information to the appropriate printers 100. In one embodiment, each printer 100 is configured to compare printer serial numbers contained in received fonts 710 with the serial number of the printer 100, and is also configured to verify the print job sender's identification to ensure that the client computer 702 or network user is allowed to use the font 710.

It will be understood by a person of ordinary skill in the art that functions performed by computer 702 and printers 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides a security mechanism to deter font licensing violations, which involves incorporating a serial number of a printer into a font's data structure. One form of the invention provides font security by making a change to conventional printer firmware, and to conventional printer font data structures. One embodiment of the present invention provides a font security mechanism that is contained within a printer device. In one embodiment, printer font entities are modified to allow for the storage of a printer serial number(s) in the font headers of fonts stored in a printer file system. One embodiment of the invention helps to prevent use of illegal copies of fonts by "serializing" a font to the first printer that used the font, thereby configuring the font to be used only on that one printer. In another embodiment, fonts are "serialized" to a plurality of printers, so that the fonts are useable on that plurality of printers, but not on other printers. One form of the invention provides a method for extending license violation protection to fonts that are stored on client computers and used for printing purposes.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling usage of fonts stored in a printer, the method comprising:
   detecting a request for use of a first one of the fonts by a print job, wherein the first font includes a first value representing a maximum number of printers authorized to use the first font;
   comparing printer identification information contained in the first font to a printer identifier stored in the printer; and
   controlling usage of the first font by the printer based on the comparison.

2. The method of claim 1, wherein the printer identification information includes at least one printer serial number, and the printer identifier is a printer serial number.

3. The method of claim 1, and further comprising:
   preventing use of the first font by the printer if the printer identifier does not match data in the printer identification information.

4. The method of claim 3, and further comprising:
   using a substitute font in place of the first font if the printer identifier does not match data in the printer identification information.

5. The method of claim 1, and further comprising:
   identifying whether the first font includes printer identification information; and
   storing the printer identifier in the first font if the first font does not include printer identification information.

6. The method of claim 1, and further comprising:
   identifying a number of printers currently identified in the printer identification information; and
   comparing the identified number of printers to the first value.

7. The method of claim 6, and further comprising:
   storing the printer identifier in the first font if the identified number of printers is less than the first value.

8. The method of claim 1, wherein the printer identification information is encrypted, the method further comprising:

decrypting the printer identification information prior to comparing the printer identification information to the printer identifier.

9. A print apparatus comprising:
a print engine;
at least one memory for storing a font and a printer identifier, the font including printer identification information, the printer identification information identifying a plurality of primers authorized to use the font; and
a font manager for comparing the printer identifier to the printer identification information, and providing an indication of the permissibility of usage of the font by the print apparatus based on the comparison.

10. The print apparatus of claim 9, wherein the printer identification information includes at least one printer serial number, and the printer identifier is a printer serial number.

11. The print apparatus of claim 9, wherein the font manager is configured to indicate that the font is not to be used by the print apparatus if the printer identifier does not match data in the printer identification information.

12. The print apparatus of claim 9, wherein the print apparatus is configured to use a substitute font if the printer identifier does not match data in the printer identification information.

13. The print apparatus of claim 9, wherein the font manager is configured to identify whether the font includes printer identification information, and store the printer identifier in the font if the font does not include printer identification information.

14. The print apparatus of claim 9, wherein the font includes a first value representing a maximum number of printers authorized to use the font, and wherein the font manager is configured to identify a number of printers currently identified in the printer identification information, and compare the identified number of printers to the first value.

15. The print apparatus of claim 14, wherein the font manager is configured to store the printer identifier in the font if the printer identification information does not include the printer identifier and if the identified number of printers is less than the first value.

16. The print apparatus of claim 14, wherein the printer identification information and the first value are encrypted.

17. A method of controlling usage of fonts stored on a computer, the method comprising:
storing printer identification information in a first one of the fonts, the printer identification information identifying a plurality of printers authorized to use the font;
downloading the first font from the computer to a first printer during a print job;
comparing with the first printer the printer identification information contained in the first font to a printer identifier stored in the first printer; and
controlling usage of the first font by the first printer based on the comparison.

18. The method of claim 17, wherein the computer is configured to be coupled to a first plurality of printers, the method further comprising:
receiving with the computer a printer identifier from each of the printers in the first plurality; and
storing the printer identifiers received from the printers in the first font.

19. A print apparatus comprising:
print engine means for forming an image on media;
storage means for storing a font and a printer identifier, the font including printer identification information, the printer identification information identifying a plurality of printers authorized to use the font;
means for comparing the printer identifier to the printer identification information; and
means for controlling usage of the font by the print apparatus based on the comparison.

20. The print apparatus of claim 19, wherein the means for controlling is configured to prevent usage of the font if the printer identifier does not match data in the printer identification information.

21. A computer-readable medium having computer-executable instructions for performing a method of controlling usage of a font stored in a printer, the method comprising:
detecting a request for use of the font by a print job, wherein the font includes a first value representing a maximum number of printers authorized to use the font;
comparing printer identification information contained in the font to a printer identifier stored in the printer; and
controlling usage of the font by the printer based on the comparison.

22. The computer-readable medium of claim 21, wherein the method further comprises:
preventing use of the font by the printer if the printer identifier does not match data in the printer identification information.

23. The computer-readable medium of claim 21, wherein the method further comprises:
identifying whether the printer identification information includes the printer identifier; and
storing the printer identifier in the font if the printer identification information does not include the printer identifier.

24. The computer-readable medium of claim 21, wherein the method further comprises:
identifying a number of printers currently identified in the printer identification information;
comparing the identified number of printers to the first value; and
storing the printer identifier in the font if the identified number of printers is less than the first value.

* * * * *

UNITED STATES PATENT AND TRADEMARK OFFICE
CERTIFICATE OF CORRECTION

PATENT NO. : 7,262,869 B2 Page 1 of 1
APPLICATION NO. : 10/385101
DATED : August 28, 2007
INVENTOR(S) : Curtis Reese et al.

It is certified that error appears in the above-identified patent and that said Letters Patent is hereby corrected as shown below:

In column 5, line 8, delete "2101B" and insert -- 210B --, therefor.

In column 9, line 9, in Claim 9, delete "primers" and insert -- printers --, therefor.

Signed and Sealed this

Twenty-fourth Day of June, 2008

JON W. DUDAS
*Director of the United States Patent and Trademark Office*